United States Patent [19]

Tsukamoto et al.

[11] Patent Number: 4,771,368
[45] Date of Patent: Sep. 13, 1988

[54] METER DIAL ILLUMINATING DEVICE

[75] Inventors: Sakae Tsukamoto; Hiroyoshi Kenmotsu; Tsuyoshi Ozaki; Takahiro Masuda, all of Shimada, Japan

[73] Assignee: Yazaki Corporation, Tokyo, Japan

[21] Appl. No.: 14,322

[22] Filed: Feb. 13, 1987

[30] Foreign Application Priority Data

| Feb. 17, 1986 | [JP] | Japan | 61-030699 |
| Jan. 21, 1987 | [JP] | Japan | 62-006024 |
| Jan. 21, 1987 | [JP] | Japan | 62-006025 |
| Jan. 21, 1987 | [JP] | Japan | 62-006026 |

[51] Int. Cl.$^4$ .............................................. G01D 11/28
[52] U.S. Cl. ............................................................ 362/29
[58] Field of Search ................ 362/23, 26, 27, 29, 362/30

[56] References Cited

U.S. PATENT DOCUMENTS

| 1,743,401 | 1/1930 | Schlaich | 362/23 |
| 3,214,577 | 10/1965 | Protzmann | 362/26 |
| 4,044,708 | 8/1977 | Klein | 362/29 |
| 4,233,927 | 11/1980 | Oikawa et al. | 362/26 |
| 4,258,643 | 3/1981 | Ishikawa et al. | 362/26 |
| 4,559,582 | 12/1985 | Scardilli et al. | 362/23 |
| 4,625,262 | 11/1986 | Sakakibara et al. | 362/32 |

FOREIGN PATENT DOCUMENTS 594142  3/1960  Canada ................................ 362/26

Primary Examiner—Charles J. Myhre
Assistant Examiner—David A. Okonsky
Attorney, Agent, or Firm—Murray and Whisenhunt

[57] ABSTRACT

A meter dial illuminating device for illuminating a dial by means of a light incident upon a back surface thereof. The dial is formed of a light transmitting material except at a portion where characters and a scale are indicated. As a result, the front surface of the dial is illuminated by the light incident upon the back surface of the light guiding plate and transmitted therethrough.

17 Claims, 6 Drawing Sheets

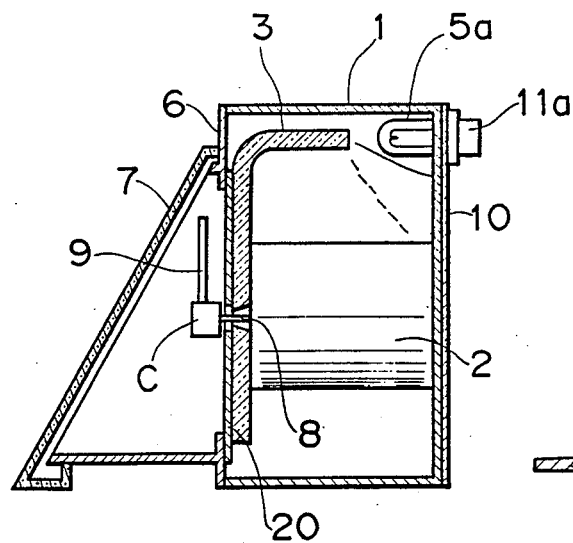
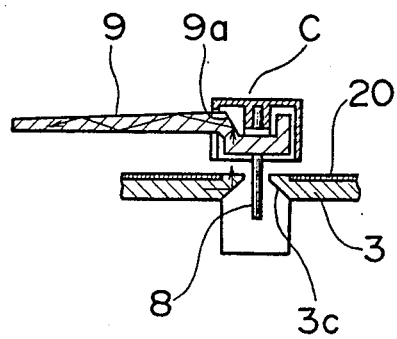
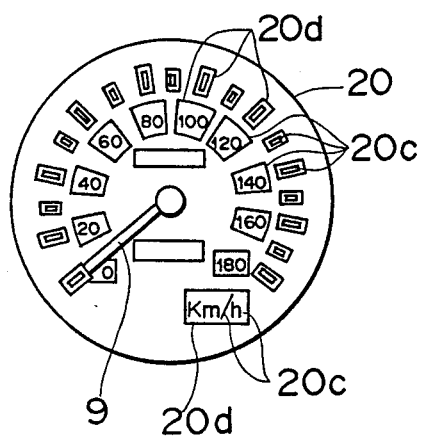
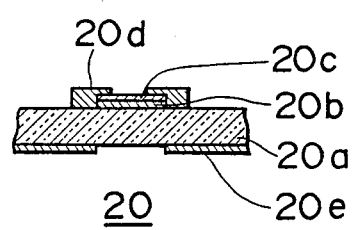

METER DIAL ILLUMINATING DEVICE

BACKGROUND OF THE INVENTION

The present invention relates to a meter dial illuminating device, and more particularly to a meter dial illuminating device in which a portion of a dial except that where characters and a scale are indicated is formed of a light transmitting material, and a front surface of the dial is illuminated by a light transmitted through said light transmitting portion, thereby providing a dial illuminating device which may improve visibility with less fatigue of the eyes without increasing costs and enlarging a size of the meter.

Conventionally, in a meter such as a speedometer and a fuel gauge for a vehicle, characters and a scale, etc. indicated on a meter dial are formed of a light transmitting material, and the other portion is formed of a light cutting material. A light incident upon a back surface of the dial in the night is transmitted through the light transmitting characters and scale formed on the dial to thereby enable a driver to visually perceive the characters and the scale.

However, there is generated an excessively sharp contrast in brightness between the characters and the scale which are illuminated and the other portion not illuminated, which causes fatigue of the eyes.

To eliminate such a defect, there has been used a dial illuminating device as shown in FIG. 1, which is designed to also illuminate a front surface of the dial.

A dial 4 is mounted to a meter driver 2 fixed to a bottom of a meter case 1 with a light guiding plate 3a interposed between the dial 4 and the meter driver 2. A light emitted from a bulb 5a provided at the bottom of the meter case 1 is guided from one end of the light guiding plate 3a through the same to a back surface of the dial 4. The guided light is transmitted through the light transmiting characters and scale formed on the dial 4 to a front surface of the dial 4. On the other hand, another bulb 5b is provided at the bottom of the meter case 1, and another light guiding plate 3b is provided on the meter case 1 or a background 6. A light emitted from the bulb 5b is guided through the light guiding plate 3b to a hole 6b formed through a horizontal wall 6a of the background 6, and the light is illuminated through the hole 6b onto the front surface of the dial 4.

The background 6 is provided at a front opening of the meter case 1 to act as a mask for concealing an outer peripheral portion of the dial 4 and the meter driver 2. A front glass plate 7 is provided in front of the background 6 so as to prevent a dust from depositing on the dial 4 and from penetrating into the meter case 1. A rotating shaft 8 is projected from the meter driver 2 through center hole of the dial 4, and a self-illuminating pointer 9 is mounted on the rotating shaft 8.

Sockets 11a and 11b for receiving the bulbs 5a and 5b are mounted on a back surface of the meter case 1 with a feeder wiring board 10 interposed between the back surface and the sockets 11a and 11b, so that the bulbs 5a and 5b may be switched on at night.

A color filter 12 is provided between the hole 6b and the light guiding plate 3b so as to color the light illuminated through the hole 6b onto the front surface of the dial 4. A light shielding plate 13 is provided to prevent the light illuminated through the hole 6b from being directly leaked through the front glass plate 7, causing reflection of the light on a windshield and the like of the vehicle to hinder a front visible field of the driver when driving.

FIG. 2 is an elevational view of a speedometer using the dial 4 as mentioned above, and FIG. 3 is a cross-sectional view of the dial 4. As shown in FIG. 3, the dial 4 is constructed such that a chromatic translucent layer 4b and a white translucent layer 4c are formed on a transparent base member 4a in this order, and a black opaque layer 4d is formed on the white translucent layer 4c except a portion where the characters and the scale are indicated. With this construction, the characters and the scale are visualized in white when the light is off, while they are visualized in chromatic color of the layer 4b when the light is on.

In the prior art device as mentioned above, the front surface of the dial 4 through which the light from the bulb 5a is transmitted at the location of the characters and the scale is illuminated by guiding the light from the bulb 5b through the light guiding plate 3b, the color filter 12 and the hole 6b formed through the horizontal wall 6a of the background 6 to the front surface of the dial 4, so as to reduce the difference in brightness on the dial 4. Therefore, it is necessary to provide additional parts of the light guiding plate 3b, the color filter 12 and the light shielding plate 3, which causes an increase in parts cost and installation cost and also causes an increase in weight due to an enlarged size of the meter including the additional parts. Furthermore, the transmittance illumination effect of the characters and the scale is reduced by the light illuminating the front surface of the dial, and thereby a commodity value becomes low. In addition, a part of the light transmitting the front surface of the dial is reflected on the windshield to dazzle the driver.

Accordingly, it is an object of the present invention to provide a meter dial illuminating device which may reduce the difference in brightness between the portions of the characters and the scale on the dial and the other portion of the dial to eliminate fatigue of the eyes, without using numerous additional parts to illuminate the front surface of the dial.

According to the present invention, in a meter dial illuminating device for illuminating a dial by a light incident upon a back surface of the dial and transmitted through a front surface of the dial, the improvement is characterized in that a portion of the dial except at least characters and a scale is formed of a light transmitting material, so as to illuminate the front surface of the dial by the light transmitted through the portion.

A relatively large area in comparison with the characters and the scale is formed of the light transmitting material, and the front surface of the dial is designed to be illuminated by the light transmitted through the large area. Therefore, in comparison with the prior art device wherein the light is transmitted through only the characters and the scale, the present invention may provide sufficient illumination effect with a weak light and thereby improve the visibility with no fatigue of the eyes.

BRIEF DESCRIPTION OF THE DRAWINGS

FIG. 4a is a sectional view of one embodiment of the present invention;

FIG. 4b is an enlarged sectional view illustrating the structural relationship the light guiding plate and the pointer used in the above embodiment;

FIG. 5 is a sectional view of the dial in FIGS. 4a and 4b;

FIG. 6 is a plan view of the same dial;

DETAILED DESCRIPTION OF THE EMBODIMENT

There will be now described some preferred embodiments of the present invention with reference to the drawings.

Figure 1:
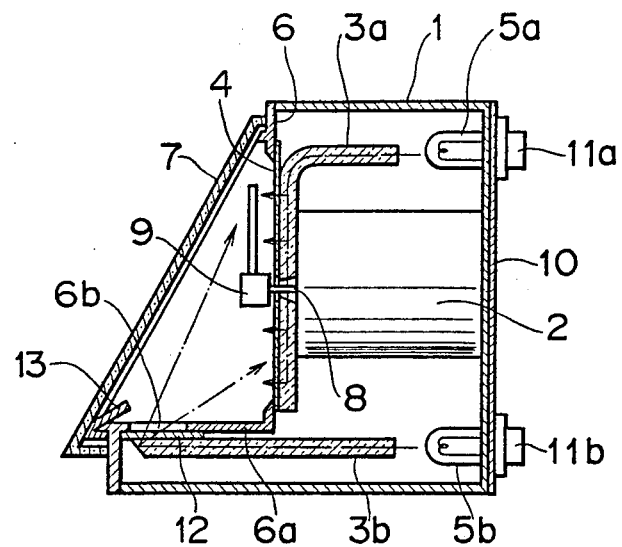
FIG. 1 is a sectional view of a meter using a conventional dial illuminating device.

FIG. 4a shows a meter dial illuminating device of a preferred embodiment according to the present invention, in which the same or like parts as in FIG. 1 are designated by the same reference numerals.

Referring to FIG. 4a, reference numeral 20 designates a dial formed of a light transmitting material at a portion except the characters and the scale. The use of the dial 20 obviates the light guiding plate 3b, the bulb 5b, the hole 6b of the background 6, the color filter 12 and the light shielding plate 13 in the meter as shown in FIG. 1.

In FIG. 4b, it is shown how the light transmitted through the light guiding plate 3 is reflected by a conical surface centrally formed therein to be deflected toward the pointer 9. Since cap C covering the axial center of the pointer 9 is open at its bottom, the deflected light enters the pointer to be further deflected by a conical surface 9a formed in the pointer to proceed along the pointer length, repeating reflection therewithin.

FIGS. 5 and 6 show a preferred structure of the dial 20.

Figure 3:
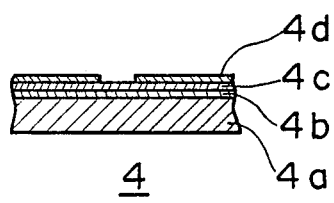
FIG. 3 is a sectional view of the dial shown in FIG. 1.

Referring to FIG. 5, reference numeral 20a designates a black translucent base member formed of a smoked polycarbonate board, for example. A chromatic color translucent layer 20b is printed on a part of a front surface of the base member 20a. A white translucent layer 20c is superimposedly printed on the chromatic color translucent layer 20b. A black opaque layer 20d is printed on the white translucent layer 20c in such a manner as to surround the latter except a portion of the characters and the scale as shown in FIG. 3. A chromatic translucent layer 20e is printed on a back surface or the base member 20a except a portion corresponding to the chromatic translucent layer 20b and the white translucent layer 20c.

With this construction of the dial, in the daytime, the characters and the scale are visualized in white through the white translucent layer 20c surrounded by the black opaque layer 20d and exposed to the front surface of the dial, while the other portion of the dial is visualized in black through the black opaque layer 20d and the black translucent base member 20a. In the night, the light from the bulb 5a is guided through the light guiding plate 3 onto the back surface of the dial 20. Accordingly, the character and the scale are visualized in the color of the light transmitting through the black translucent base member 20a, the chromatic color translucent layer 20b and the white translucent layer 20c, while the other portion of the dial is visualized in the color of the light transmitting through the chromatic translucent layer 20e and the black translucent base member 20a.

In transmitting the light through the dial 20 in the night, the black opaque layer 20d acts to prevent an outline of the characters and the scale from being rendered indistinct because of mixing of the color of both the chromatic translucent layers 20b and 20e.

For the purpose of dimming the chromatic translucent layers 20e and 20b, a white, gray or black halftone printed layer is formed on the black opaque layer from the back surface of the dial 20. At this time, different dimmed colors are lapped or separated in the range of the black opaque layer 20d, thereby hindering nonuniformity of the transmitted light from being visually perceived. Furthermore, the black opaque layer 20d acts to shield a bright transmitted light, which is not transmitted through the chromatic translucent layer 20e, around the characters and the scale due to slip in printing between the white translucent layer 20c and the chromatic color translucent layer 20b printed on the front surface and the chromatic translucent layer 20e printed on the back surface.

FIGS. 7 to 12 show modified embodiments of the dial 20, in which the same parts as in FIG. 5 are designated by the same reference numerals.

Figure 7:
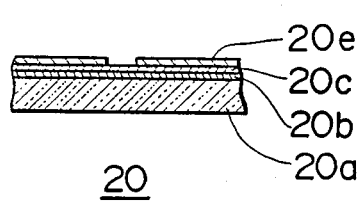
FIGS. 7 to 12 are sectional views of various modifications of the dial structure.

In the dial 20 as shown in FIG. 7, a chromatic translucent layer 20b and a white translucent layer 20c are printed on an entire front surface of a base member 20a in this order, and a chromatic translucent layer 20e is printed on the white translucent layer 20c except a portion of the characters and the scale. In this embodiment, the base member 20a may be translucent or transparent.

Figure 2:
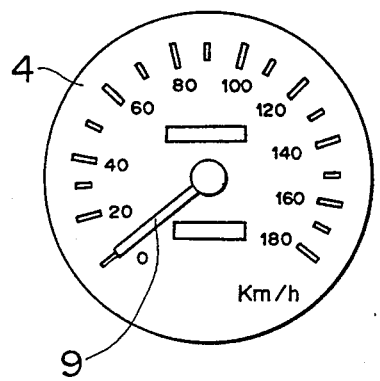
FIG. 2 is a plan view of the dial shown in FIG. 1.

In the daytime, the character and the scale are visualized in white, while the other portion of the dial 20 is visualized in the color of the layer 20e. In the night, the characters and the scale are visualized in mixed color of the white layer 20c and the chromatic layer 20b, while the other portion is visualized in mixed color of the layers 20b, 20c and 20e. In this embodiment, the black opaque layer 20d shown in FIG. 2 is not provided since the chromatic translucent layers 20b and 20e are formed on one side of the base member 20a in contact with each other, and the mixed color of the layers 20b and 20e does not bleed into the portion of the character and the scale.

Figure 8:
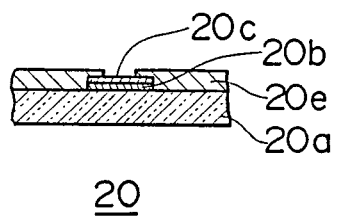

In the dial 20 as shown in FIG. 8, a chromatic translucent layer 20b and a white translucent layer 20c are formed at a portion of the character and the scale and a peripheral portion thereof rather than on the entire front surface of a base member 20a, and a chromatic translucent layer 20e is formed on the entire front surface of the base member 20a except the portion of the characters and the scale. In this embodiment, the operation is substantially the same as with the embodiment of FIG. 4, with the exception that the portion other than the character and the scale is visualized in mixed color of the chromatic translucent layer 20e and the base member 20a.

Figure 9:
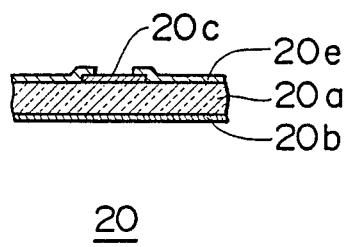

In the dial 20 as shown in FIG. 9, the chromatic translucent layer 20b of FIG. 8 is formed on the entire back surface of the base member 20a.

Figure 10:
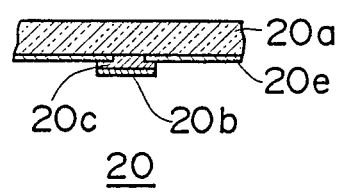

In the dial 20 as shown in FIG. 10, the base member 20a is transparent, and all the layers 20b, 20c and 20e are formed on the back surface of the base member 20a.

In the embodiment of FIG. 9, if the translucent layers 20b and 20c are colored in blue and amber, respectively, the character and the scale are visualized in white, and the other portion is visualized in amber in the daytime, while in the night, the characters and the scale are visualized in blue, and the other portion is visualized in red, that is, mixed color of blue and amber.

Figure 12:
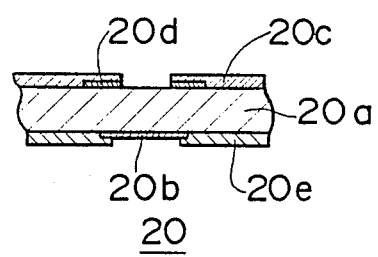

In the dial 9 as shown in FIG. 12, the base member 20a is formed of a black translucent material. Accordingly, the characters and the scale are indicated in black in the daytime, while in the night, the character and the scale are indicated in color of the chromatic translucent layer 20b, and the other portion is visualized in mixed color of the chromatic layer 20e and the white layer 20c.

Figure 11:
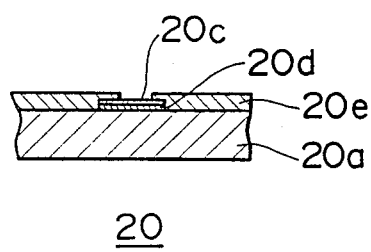

Although the light is allowed to be transmitted through the portion of the characters and the scale and the other portion in the night in this embodiment, an opaque layer 20d may be formed under the white layer 20c forming the character and the scale as shown in FIG. 11, so as to block the light transmittance through the portion of the character and the scale in the night. In this case, as the area other than the portion of the character and the scale is relatively large, the character and the scale may be visually perceived by the light transmitted through the large area.

Figure 13:
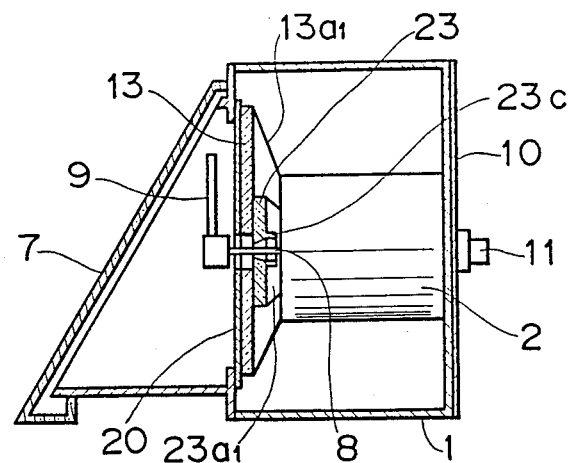
FIG. 13 is a sectional view of another embodiment of the present invention.
Figure 14:
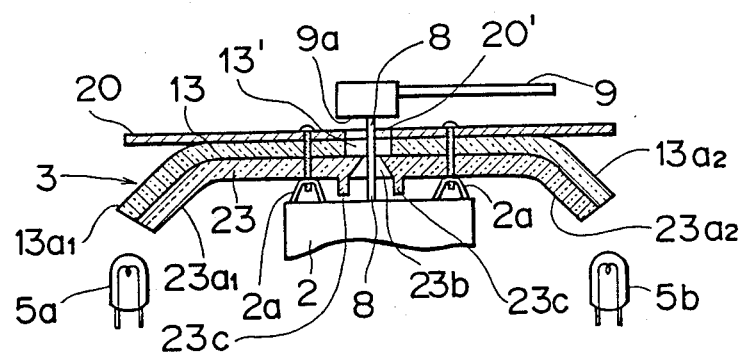
FIG. 14 is an enlarged sectional view of the central portion of the embodiment of FIG. 13.
Figure 15:
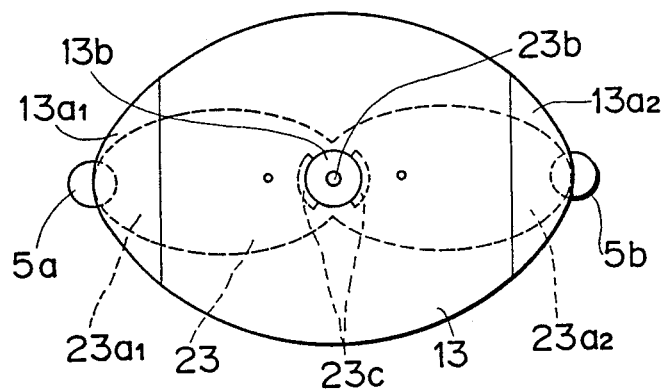
FIG. 15 is a plan view of the embodiment of FIG. 13, wherein the dial and the pointer are removed.

Referring to FIGS. 13 through 15, a light guiding plate 3 comprises a dial illumination light guiding plate 13 and a pointer illumination light guiding plate 23. The dial illumination light guiding plate 13 is downwardly bent at both end portions to form light receiving portions $13a_1$ and $13a_2$. The light receiving portions $13a_1$ and $13a_2$ are opposed to light sources 5a and 5b provided at a bottom of a meter case 1, respectively, so as to receive a light from the light sources 5a and 5b. The light received by the light receiving portions $13a_1$ and $13a_2$ is uniformly diffused in the light guiding plate 13, and is propagated from a front surface of the light guiding plate 13, which surface has an area almost identical with that of a dial 20, to a back surface of the dial 20. An outer peripheral edge of the light guiding plate 13 acts as a reflective surface to assist uniform diffusion of the light in the light guiding plate 13.

On the other hand, the pointer illumination light guiding plate 23 is downwardly bent at both end portions like the dial illumination light guiding plate 13 to form light receiving portions $23a_1$ and $23a_2$. The light receiving portions $23a_1$ and $23a_2$ are opposed to the light sources 5a and 5b to receive the light from the light sources 5a and 5b. The light guiding plate 23 includes a light emitting portion 23b of a conical hole formed at a substantially central position thereof. The light guiding plate 23 has an external form such that the light emitted from the light sources 5a and 5b into the light receiving portions $23a_1$ and $23a_2$ may be efficiently collected at the light emitting portion 23b. For example the external form of the light guiding plate 23 is obtained by overlapping two ellipses having foci at the positions of the light sources 5a and 5b and the light emitting portion 23b. The light collected at the light emitting portion 23b is reflected on a conical reflective surface formed by the conical hole and is emitted from the front surface of the light guiding plate 23. The emitted light is propagated through holes 13' and 20' formed at substantially central positions of the light guiding plate 13 and the dial 20, respectively, into a light receiving portion 9a of a pointer 9.

The light guiding plates 13 and 23 and the dial 20 are superimposed on stays 2a of a meter driver 2 in this order, and are fixed by screws. Although the back surface of the light guiding plate 13 is in direct contact with the front surface of the light guiding plate 23 as shown in the drawings, a small gap may be preferably defined therebetween, so as to suppress interference of the light between both the light guiding plates 13 and 23 and effectively utilize the respective lights guided through the light guiding plates 13 and 23.

The light guiding plate 23 is formed on its back surface with a pair of arcuate projections 23c along the conical hole forming the light emitting portion 23b. The projections 23c act to prevent the light from the light sources 5a and 5b from directly entering the conical hole not through the light guiding plate 23 and being leaked through a gap between the conical hole and a rotating shaft 8 to the front surface of the dial 20. The structure to deflect the light transmitted through the light guiding plate 23 toward the pointer 9 is substantially the same as described in reference to FIG. 4b.

In operation, when the light sources 5a and 5b are switched on in the dark, by turning a light switch such as in the night, the light emitted from the light sources 5a and 5b enters the light receiving portions $13a_1$ and $13a_2$ of the light guiding plate 13 and the light receiving portions $23a_1$ and $23a_2$ of the light guiding plate 23. The light received by the light receiving portions $13a_1$ and $13a_2$ is uniformly diffused in the light guiding plate 13 to illuminate the back surface of the dial 20. As a result, the light is transmitted through a light transmitting portion of the dial 20 to the front surface of the dial 20, thereby illuminating the front surface of the dial 20. At this time, a strength of the light transmitted to the front surface of the dial 20 is made uniform over the entire area of the light transmitting portion, thus eliminating nonuniformity of illumination. Accordingly, the present invention is effective especially when adapted to an illumination device for illuminating the entire front surface of the dial 20 by a transmitted light, and it is also effective in case of illuminating only characters and a scale by a transmitted light since brightness of the character and the scale may be made uniform.

The light received by the light receiving portions $23a_1$ and $23a_2$ is reflected on a reflective surface of the elliptic outer edge of the light guiding plate 23, and is thereby efficiently collected at the light emitting portion 23b. The light collected by the light emitting portion 23b is reflected on the conical reflective surface of the light emitting portion 23b, and is propagated from the front surface of the light guiding plate 23 through the hole 13b of the light guiding plate 13 and the hole 20' of the dial 20 to the light receiving portion 9a of the pointer 9. The light received by the light receiving portion 9a illuminates the pointer 9 with high luminance.

As is described above, the light guiding plates for illumination of the dial and illumination of the pointer to be used for difference purposes are provided independently. Accordingly, the light guiding plates may be effectively utilized for the respective purposes. Furthermore, uniformity of the transmitted light for illuminating the dial and increased luminance of the light for illuminating the pointer may be simultaneously achieved, thereby greatly improving a commodity value of the meter.

Figure 16:
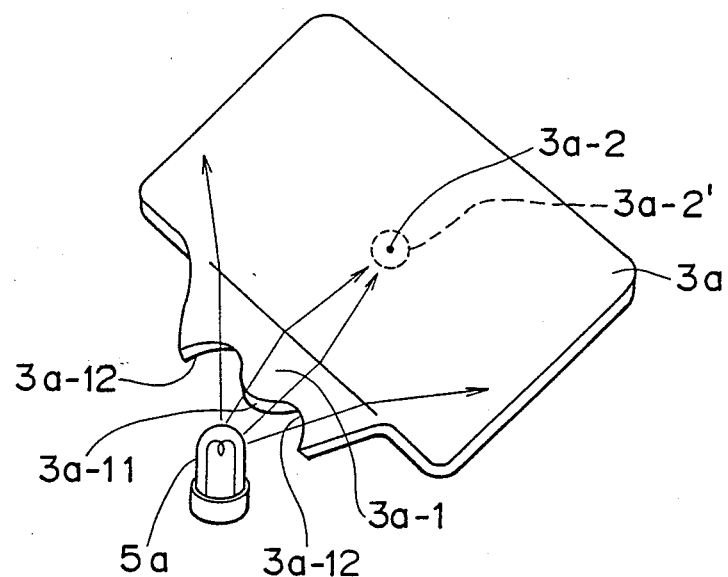
FIG. 16 shows a light guiding plate used in a further embodiment of the present invention.
Figure 17:
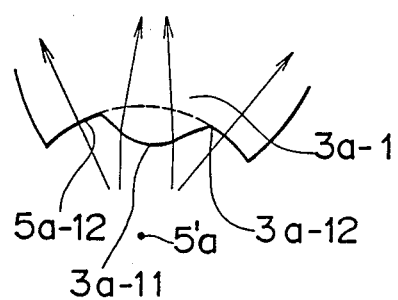
FIG. 17 shows a portion of the light guiding plate shown in FIG. 16.

FIG. 16 is a perspective view of a preferred embodiment of the light guiding plate 3a, and FIG. 17 is a plan view of an essential part of the light guiding plate 3a shown in FIG. 16. The light guiding plate 3a is formed at one side of its outer periphery with a light receiving portion 3a-1, and is further formed at its substantially central position with a light emitting portion 3a-2 of a conical hole. The light receiving portion 3a-1 has a light receiving surface opposed to a light source 5a. The light receiving surface comprises a first curved surface 3a-11 projecting to said light source 5a and a second curved surface 3a-12 formed by a part of a concentric circle about the light source 5a as a center 5a' or a curved line approximating to the concentric circle, on both sides of the first curved surface 3a-11. The first curved surface 3a-11 is located on a line connecting the light source 5a with the light emitting portion 3a-2, so that the light emitted from the light source 5a to the first curved surface 3a-11 may be collected to the light emitting portion 3a-2 by a convex lens function of the curved surface 3a-11. On the other hand, the light emitted from the light source 5a to the second curved surface 3a-12 is uniformly diffused over the entire surface of the light guiding plate 3a by a concave lens function of the curved surface 3a-12.

With this arrangement, the light from the light source 5a is collected at the light emitting portion 3a-2, and is reflected on a conical reflective surface 3a-2' of the light emitting portion 3a-2 to be received by a light receiving portion of a pointer 9, thus illuminating the pointer 9 with a high luminance. At the same time, the light from the light source 5a is uniformly diffused over the entire surface of the light guiding plate 3a, and thereby the dial 4 may be uniformly illuminated over the entire surface by the light transmitted therethrough.

As is described above, the portion other than the character and the scale is formed of a light transmitting material, so as to illuminate the dial in the night by the light transmitted through the portion having a relatively large area. Therefore, as compared with the prior art device which is designed to illuminate the dial by the light transmitted through only the character and the scale, the present invention may reduce fatigue of the eyes and reduce the number of parts, thereby attaining cost reduction and small size of the meter.

Furthermore, the light receiving portion of the light guiding plate is formed with two kinds of curved surfaces, one of which serves to collect the light from the light source to the light emitting portion and the other serves to uniformly diffuse the light from the light source over the entire surface of the light guiding plate. Accordingly, the pointer may be illuminated with a high luminance, and the dial may be uniformly illuminated over the entire surface by the light transmitted therethrough.

Figure 18:
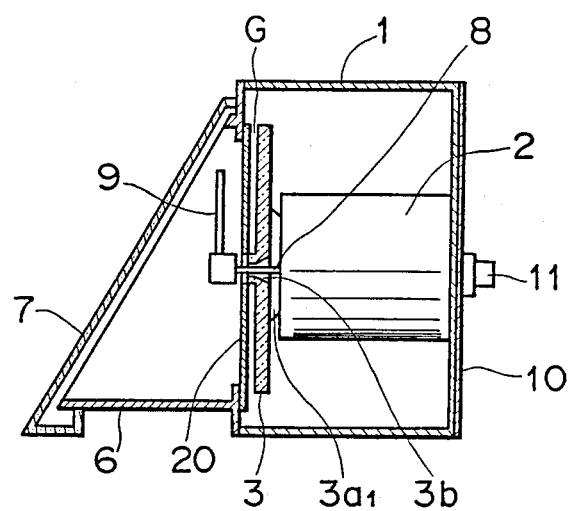
FIG. 18 is a sectional view of a still further embodiment of the present invention.
Figure 19:
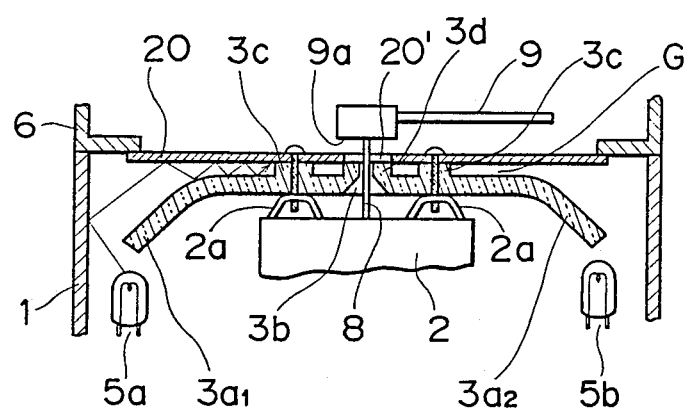
FIG. 19 is an enlarged sectional view of the embodiment of FIG. 18.

Referring to FIGS. 18 and 19, a plurality of posts 3c is projected from a surface of a light guiding plate 3 opposite to a dial 20. The dial 20 is disposed on the posts 3c. The posts 3c and the portions of the dial 20 contacting the posts 3c are formed with holes through which screws 15 are inserted. The screws 15 are inserted through the holes, and are threadedly engaged with stays 2a of a meter driver 2 to fix the light guiding plate 3 and the dial 4 to the stays 2a of the meter driver 2.

Here again, the structure to deflect the light transmitted through the light guiding plate 3 toward the pointer 9 is substantially the same as described in reference to FIG. 4b.

There is defined a gap G corresponding to a height of the posts 3c between the light guiding plate 3 and the dial 20. The gap G has a size such that the light emitted from light sources 5a and 5b and reflected on an inner wall surface of a meter case 1 may be admitted through the gap G into a sufficiently inside area, and that the light emitted from the light sources 5a and 5b and guided through the light guiding plate 3 may enter the back surface of the dial 20.

Accordingly, the back surface of the dial 20 may be substantially uniformly illuminated by the light reflected on the inner wall surface of the meter case 1 and the light guided by the light guiding plate 3, thereby eliminating a difference in brightness of the light transmitted through a light transmitting portion of the dial 20.

Furthermore, a light emitting portion 3b of the light guiding plate 3 is formed with a light guiding passage 3d extending to the back surface of the dial 20 and exposed to a center hole 20' of the dial 20, so as to prevent light guiding efficiency to a pointer 9 from being reduced because of an increase in distance between the light emitting portion 3b of the light guiding plate 3 and a light receiving portion of the pointer 9 by the provision of the gap G.

Accordingly, there is no possibility that an incident light to the pointer 9 is decreased to hinder the illumination of the pointer by the provision of the gap G.

As is described above, since the gap is defined between the light guiding plate and the dial, a synthesized light of the light reflected on the inner wall surface of the meter case and the light guided by the light guiding plate may be substantially uniformly applied to the back surface of the dial without forming an annular dark areas thereon. Thus, the light transmitting portion of the dial may be easily uniformly illuminated by the light transmitted therethrough, thereby greatly improving a commodity value of the meter.

As is described above, the portion other than the character and the scale is formed of a light transmitting material, so as to illuminate the dial in the night by the light transmitted through the portion having a relatively large area. Therefore, as compared with the prior art device which is designed to illuminate the dial by the light transmitted through only the characters and the scale, the present invention may reduce fatigue of the eyes and reduce the number of parts, thereby attaining cost reduction and small size of the meter.

We claim:

1. A meter dial illuminating device for illuminating a dial by means of light incident upon a back surface thereof to be transmitted to a front surface thereof, said device comprising a dial formed to allow transmission of light through at least a portion thereof except where characters and a scale are indicated, said portion including a first chromatic translucent layer and a second chromatic translucent layer applied on top of said first chromatic translucent layer, said first and second chromatic translucent layers having different colors from each other, said front surface of said dial being illuminated by light incident upon said back surface thereof and transmitted therethrough, said portion being visible in different colors dependent on the presence and absence of illumination by transmitted light.

2. A meter dial illuminating device according to claim 1, wherein said first chromatic translucent layer includes a base member and said second chromatic translucent layer is printed on said base member.

3. A meter dial illuminating device according to claim 1, and further including a transparent base member, said first and second chromatic translucent layers being printed thereon.

4. A device according to claim 2, wherein said base member is covered with a white translucent layer at a portion where the characters and scale are indicated, said base member and said white translucent layer being interposed with a chromatic translucent layer.

5. A device according to claim 3, wherein said second chromatic translucent layer includes a white translucent layer covering said base member and said second chromatic translucent layer includes a chromatic translucent layer interposed between said base member and said white translucent layer.

6. A device according to claim 2, whereain said second chromatic translucent layer includes a white translucent layer covering said base member at a portion where the characters and the scale are indicated, said base member and said white translucent layer being interposed by a black opaque layer.

7. A device according to claim 2, wherein said second chromatic translucent layer includes a translucent layer covering said base member except at a portion where the characters and the scale are indicated.

8. A device according to claim 7, wherein said base member is covered with a white translucent layer at a portion where the characters and the scale are indicated, said base member and said white translucent layer being interposed with a chromatic translucent layer, said white translucent layer being surrounded by a black opaque layer.

9. A device according to claim 2, wherein said second chromatic layer includes a chromatic translucent layer covering the back surface of the base member except at a portion where the characters and the scale are indicated, said dial further including a white translucent layer printed on the front surface of the base member except at a portion where the characters and the scale are indicated.

10. A device according to claim 5, wherein said dial further includes a chromatic translucent layer printed on said white translucent layer at a portion except where the characters and the scale are indicated.

11. A device according to claim 1, further including means for guiding light to the back surface of the dial from a light source.

12. A device according to claim 11, wherein said means includes a light guiding plate attached to the back surface of the dial.

13. A device according to claim 11, further including a pointer attached to the front surface of the dial.

14. A device according to claim 13, wherein said means includes a dial illumination light guiding plate and a pointer illumination light guiding plate.

15. A device according to claim 11, wherein said means includes a light guiding plate attached to the back surface of the dial for illuminating the dial, said device further including a pointer attached to the front surface of the dial.

16. A device according to claim 15, wherein said dial and said light guiding plate are formed with center holes, said pointer having a pointer shaft extending through said center holes, said center hole of the light guiding plate being of conical shape to deflect the light toward the dial through the center hole of the dial, said light guiding plate having at a periphery thereof a first curved surface for collecting the light from the light source to the center hole thereof and a second curved surface for diffusing the light from said light source over the entire surface of the light guiding plate.

17. A device according to claim 13, wherein said dial and said light guiding plate are provided with a gap therebetween.

* * * * *